United States Patent
Nakashima et al.

(10) Patent No.: US 12,043,750 B2
(45) Date of Patent: Jul. 23, 2024

(54) CONTINUOUS INKJET INK COMPOSITION

(71) Applicant: SAKATA INX CORPORATION, Osaka (JP)

(72) Inventors: Okinori Nakashima, Osaka (JP); Jun Kinjoh, Osaka (JP); Koki Ogasahara, Osaka (JP)

(73) Assignee: SAKATA INX CORPORATION, Osaka (JP)

(*) Notice: Subject to any disclaimer, the term of this patent is extended or adjusted under 35 U.S.C. 154(b) by 93 days.

(21) Appl. No.: 17/792,120

(22) PCT Filed: Jan. 26, 2021

(86) PCT No.: PCT/JP2021/002698
§ 371 (c)(1),
(2) Date: Jul. 11, 2022

(87) PCT Pub. No.: WO2021/157436
PCT Pub. Date: Aug. 12, 2021

(65) Prior Publication Data
US 2023/0055345 A1 Feb. 23, 2023

(30) Foreign Application Priority Data
Feb. 4, 2020 (JP) ................................. 2020-017221

(51) Int. Cl.
*C09D 11/38* (2014.01)
*C09D 11/322* (2014.01)

(52) U.S. Cl.
CPC ............ *C09D 11/38* (2013.01); *C09D 11/322* (2013.01)

(58) Field of Classification Search
CPC ....... C09D 11/322; C09D 11/38; C09D 11/00; C09D 11/30; C09D 11/52; B41J 2/01; B32B 27/08; B05D 5/00
See application file for complete search history.

(56) References Cited

U.S. PATENT DOCUMENTS

| | | | | |
|---|---|---|---|---|
| 2011/0242192 A1* | 10/2011 | Sasada | ................ | C09D 11/101 347/20 |
| 2012/0058286 A1 | 3/2012 | De Saint-Romain | | |
| 2013/0337161 A1* | 12/2013 | Akimoto | ................ | C09C 1/309 522/170 |
| 2015/0368486 A1* | 12/2015 | De Saint-Romain | ................ | C09D 11/324 428/209 |
| 2016/0083601 A1 | 3/2016 | Secord et al. | | |
| 2018/0208788 A1* | 7/2018 | De Saint Romain | ................ | C09D 11/033 |

FOREIGN PATENT DOCUMENTS

| | | | |
|---|---|---|---|
| JP | H05163448 A | 6/1993 | |
| JP | H11106993 A | 4/1999 | |
| JP | 2008297446 A | 12/2008 | |
| JP | 5179782 B2 | 4/2013 | |
| JP | 2013223859 A * | 10/2013 | |
| JP | 2014005400 A | 1/2014 | |
| JP | 2014005402 A | 1/2014 | |
| JP | 2020023648 A * | 2/2020 | ............ C09D 11/36 |
| KR | 20140024285 A * | 2/2014 | |
| WO | 2019185825 A1 | 10/2019 | |

OTHER PUBLICATIONS

International Preliminary Report on Patentability, dated Jul. 28, 2022, for corresponding international application PCT/JP2021/002698 (1 page).
Notification Concerning Transmittal of International Preliminary Report on Patentability, mailed Aug. 18, 2022, for corresponding international application PCT/JP2021/002698 (1 page).
Notification of Transmittal of Translation of the International Preliminary Report on Patentability, mailed Aug. 18, 2022, for corresponding international application PCT/JP2021/002698 (1 page).
Written Opinion of the International Searching Authority, mailed Apr. 13, 2021, for corresponding international application PCT/JP2021/002698 (4 pages).
"Chemical Fibers and Raw Materials Application Handbook," pp. 243-244, edited by China Chemical Fiber Headquarters, China Spinning Press, Jun. 30, 1996 (4 pages).
A First Office Action issued by the State Intellectual Property Office of China on Feb. 3, 2023, for Chinese counterpart application No. 202180008903.2 (8 pages).
International Search Report (ISR) mailed Apr. 13, 2021, issued for International application No. PCT/JP2021/002698. (2 pages).
Extended European Search Report (EESR) dated Feb. 1, 2024, issued for European counterpart patent application No. EP21750148.5 (5 pages).

\* cited by examiner

*Primary Examiner* — John Zimmermann
(74) *Attorney, Agent, or Firm* — Law Office of Katsuhiro Arai

(57) ABSTRACT

An object is to provide a continuous inkjet ink composition that has excellent storage stability and anticorrosion effect on a metal member, and that allows printing with good image quality. As a solution, a continuous inkjet ink composition is provided that includes a pigment, a resin, a metal salt of thiocyanic acid at 0.05 to 1.7% by mass in the composition, and tetraalkylammonium hexafluorophosphate at 0.05 to 2.7% by mass in the composition.

10 Claims, No Drawings

CONTINUOUS INKJET INK COMPOSITION

CROSS-REFERENCE TO RELATED APPLICATIONS

This application is the U.S. National Phase under 35 U.S.C. § 371 of International Application PCT/JP2021/002698, filed Jan. 26, 2021, which claims priority to Japanese Patent Application No. JP2020-017221, filed Feb. 4, 2020. The International Application was published under PCT Article 21(2) in a language other than English.

TECHNICAL FIELD

The present invention relates to a continuous inkjet ink composition containing a pigment.

BACKGROUND ART

Inkjet recording methods used by inkjet printers are broadly classified into two types including a continuous method and a drop-on-demand method. As used herein, the continuous method is an inkjet recording method characterized by continuously jetting ink droplets and deflecting a jetting path of the droplets by electrical power, so that only the ink droplets necessary for forming a recording image land on a recording medium, and the remaining ink droplets are collected to be used repeatedly. The drop-on-demand method, on the other hand, is an inkjet recording method characterized by intermittently jetting only the ink droplets necessary for forming the recording image, and landing them directly onto the recording medium.

Due to the difference in principle, the continuous recording device requires electrodes for charging and deflecting ink droplets to deflect the jetting path in addition to a device for directly injecting ink from nozzles under pressure or jetting as small droplets by ultrasonic waves, making the configuration complex and large compared with the drop-on-demand recording device. However, constantly jetting ink droplets provides excellent responsiveness compared with the case of jetting ink droplets at required points in time. Thus, the continuous recording device is able to record at a higher speed and is characterized by high discharge reliability even with a fast-drying ink. For this reason, it is mainly used for industrial applications in a field where a large number of recording media exists and recording is performed over a prolonged period, or in a field where a fast-drying ink is required for non-absorbable recording media.

A continuous inkjet ink composition has been known that contains a pigment, a dispersant, a binder resin, a conductivity-imparting agent, and an organic solvent. The continuous inkjet ink composition contains, as the binder resin, an amino group-containing vinyl chloride-vinyl acetate-vinyl alcohol copolymer in which the occupancy ratio of vinyl alcohol units in the copolymer is 4 to 7% by mass. Additionally, the continuous inkjet ink composition contains 2 to 15% by mass of the copolymer.

BACKGROUND ART LITERATURE

Patent Literature

Patent Literature 1: Japanese Patent No. 5179782

SUMMARY OF THE INVENTION

Problems to Be Solved by the Invention

The conventional continuous inkjet ink composition enables certain printing even with pigments used as a colorant. Unfortunately, the storage life is sometimes inferior to that of the case in which dyes are used as the colorant.

An object of the present invention is to provide a continuous inkjet ink composition that has excellent storage stability and anticorrosion effect on a metal member, and that allows printing with good image quality.

Means for Solving the Problems

After studying in earnest to achieve the aforementioned object, the inventors of the present invention found that the aforementioned object could be achieved by using at least two types of conductivity-imparting agents in a specific composition and eventually completed the following present invention.

1. A continuous inkjet ink composition includes a pigment, a resin, a metal salt of thiocyanic acid at 0.05 to 1.7% by mass in the composition, and tetraalkylammonium hexafluorophosphate at 0.05 to 2.7% by mass in the composition.
2. The continuous inkjet ink composition according to 1, which contains one or more types selected from tetraethylammonium hexafluorophosphate, tetrabutylammonium hexafluorophosphate, and tetrahexylammonium hexafluorophosphate as the tetraalkylammonium hexafluorophosphate.
3. The continuous inkjet ink composition according to 1 or 2, wherein the metal salt of thiocyanic acid includes sodium thiocyanate.
4. The continuous inkjet ink composition according to any one of 1 to 3, which contains a polydimethylsiloxane compound.

Effects of the Invention

The continuous inkjet ink composition of the present invention contains a pigment, a dispersant, and an organic solvent and further contains a specific component.

Thus, the continuous inkjet ink composition has excellent storage stability and anticorrosion effect on a metal member and allows printing with good image quality.

MODE FOR CARRYING OUT THE INVENTION (Pigment)

The pigment contained in the continuous inkjet ink composition of the present invention includes, for example, known inorganic pigments and organic pigments conventionally used for the continuous inkjet ink composition.

Specific examples of the inorganic pigments include carbon black, titanium oxide, zinc flower, zinc oxide, lithopone, iron oxide, aluminum oxide, silicon dioxide, kaolinite, montmorillonite, talc, barium sulfate, calcium carbonate, silica, alumina, cadmium red, red iron oxide, molybdenum red, chrome vermillion, molybdate orange, lead yellow, chrome yellow, cadmium yellow, yellow iron oxide, titanium yellow, chromium oxide, viridian, cobalt green, titanium cobalt green, cobalt chrome green, ultramarine, ultramarine blue, Prussian blue, cobalt blue, cerulean blue, manganese violet, cobalt violet, mica, etc.

Specific examples of the organic pigments include azo-based, azomethine-based, polyazo-based, phthalocyaninebased, quinacridone-based, anthraquinone-based, indigo-based, thioindigo-based, quinophthalone-based, benzimidazolone-based, isoindoline-based, isoindolinone-based, and other organic pigments, where specific examples as expressed by the color index include Pigment Black 7, Pigment Blue 15, 15:1, 15:3, 15:4, 15:6, 60, Pigment Green 7, 36, Pigment Red 9, 48, 49, 52, 53, 57, 122, 149, 168, 177, 178, 179, 206, 207, 209, 242, 254, 255, Pigment Violet 19, 23, 29, 37, 50, Pigment Yellow 12, 13, 14, 17, 24, 74, 83, 93, 94, 95, 97, 109, 110, 117, 120, 125, 128, 137, 138, 139, 147, 150, 151, 154, 155, 166, 168, 180, 185, Pigment Orange 36, 43, 51, 55, 61, etc.

Any one type of these pigments may be used alone or two or more types may be combined, where the amount used is 1.0 to 10.0% by mass, or more preferably 2.0 to 7.0% by mass, relative to the total amount of continuous inkjet ink composition in the case of an organic pigment. If the amount of pigment used is less than 1.0% by mass, coloring strength tends to be insufficient, while an amount exceeding 10.0% by mass tends to cause viscosity to rise and ink fluidity to drop.

In the case of an inorganic pigment, the amount used is 3.0 to 18.0% by mass, or more preferably 5.0 to 15.0% by mass, relative to the total amount of continuous inkjet ink composition. If the amount of pigment used is less than 3.0% by mass, coloring strength tends to be insufficient, while an amount exceeding 18.0% by mass tends to cause viscosity to rise and ink fluidity to drop.

(Dispersant)

The dispersant contained in the continuous inkjet ink composition of the present invention functions as a pigment dispersant that disperses the pigment. Further, examples include ionic or nonionic surfactants or anionic, cationic, or nonionic high-molecular compounds such as carbodiimide-based dispersants, polyester amine-based dispersants, fatty acid amine-based dispersants, modified polyacrylate-based dispersants, modified polyurethane-based dispersants, polycarboxylic acid-based dispersants, multichain polymeric nonionic-based dispersants, and polymeric ion activators. Any of these dispersants may be used alone, or two or more dispersants may be combined.

In particular, those constituted by high-molecular compounds are preferred and, for example, the carbodiimide-based compounds described in Japanese Patent Laid-open No. 2004-083872, International Patent Laid-open No. 2003/076527, and International Patent Laid-open No. 2004/000950, AJISPER PB821 and 822, which are basic functional group-containing copolymers (manufactured by Ajinomoto Fine-Techno Co., Inc.) (acid value and amine value are both 10 to 20 mgKOH/g), SOLSPERSE 56000 (manufactured by Lubrizol Corporation), SOLSPERSE 39000 (manufactured by Lubrizol Corporation), DISPERBYK (manufactured by BYK-Chemie GmbH), etc., are preferred. Any one type of these dispersants may be used alone, or two or more types may be combined.

Basic functional group-containing copolymers with an amine value of 10 to 40 mgKOH/g are preferred.

It should be noted that any of the aforementioned dispersants may be selected and used as deemed appropriate according to the type of pigment and type of organic solvent used.

The amount of dispersant used that is effective to maintain good pigment dispersibility is normally in the range of 1 to 200 parts by mass, and more preferably 1 to 60 parts by mass, relative to 100 parts by mass of the entire pigment used.

(Resins)

The continuous inkjet ink composition of the present invention may contain an amino group-containing vinyl chloride-vinyl acetate-vinyl alcohol copolymer, or may use other resins in combination as required.

The amino group-containing vinyl chloride-vinyl acetate-vinyl alcohol copolymer that can be used for the continuous inkjet ink composition of the present invention is a copolymer that basically contains vinyl chloride and vinyl acetate as essential components, and is obtained through copolymerization by adding another radical polymerizable monomer as required. Specifically, a compound may be used in which the ester bond of a vinyl acetate-derived portion is saponified and that further contains an amino group as another radical polymerizable monomer. Alternatively, an amino group is introduced through dehydrochlorination of an amino group-containing hydrocarbon compound with a vinyl chloride-derived portion.

The copolymer is constituted by a vinyl chloride unit, a vinyl acetate unit, a vinyl alcohol unit, and an amino group-containing unit. It should be noted that the vinyl chloride unit and the vinyl acetate unit refer to units constituted by, as portions occupied by vinyl chloride and vinyl acetate in the copolymer after the reaction, respectively, ethylene chains generated by cleavage of unsaturated double bonds, and residues exclusive of unsaturated double bonds of monomers which bond to the ethylene chains. That is, the vinyl chloride unit is a unit represented by [—$CH_2$—CHCl—], and the vinyl acetate unit is a unit represented by [—$CH_2$—CH(OCOCH$_3$)—]. Also, the vinyl alcohol unit is a unit constituted by an ethylene chain obtained after the ester bond of the vinyl acetate unit is hydrolyzed by saponification, and a hydroxyl group bonded to the ethylene chain. The vinyl alcohol unit is represented by [—$CH_2$—CH(OH)—]. Further, in the case in which a compound containing an amino group as another radical polymerizable monomer is used, the amino group-containing unit is a unit constituted by an ethylene chain generated by cleavage of a radical polymerizable unsaturated double bond, and a residue exclusive of unsaturated double bonds of monomers which bond to the ethylene chain. Such an amino group-containing unit is represented by [—$CH_2$—CHX—] (X is a residue exclusive of unsaturated double bonds of monomers and contains an amino group). In the case in which an amino group-containing hydrocarbon compound is introduced to a vinyl chloride unit through dehydrochlorination, the amino group-containing unit is a unit in which chlorine of the vinyl chloride unit is substituted by a residue of the amino group-containing hydrocarbon compound from which one hydrogen has been removed. Such an amino group-containing unit is represented by [—$CH_2$—CHY—] (Y is a residue of the amino group-containing hydrocarbon compound from which one hydrogen has been removed).

A method for producing the amino group-containing vinyl chloride-vinyl acetate-vinyl alcohol copolymer of the present invention includes, for example, obtaining a copolymer of vinyl chloride, vinyl acetate, and a monomer including an amino group-containing ethylenic unsaturated double bond, and saponifying the obtained copolymer to convert part of the vinyl acetate unit to the vinyl alcohol unit, obtaining the amino group-containing unit. An example of the amino group-containing ethylenic unsaturated double bond monomer includes (meth)acrylic acid dialkylaminoalkyl ester as represented by General Formula (1):

[Chemical Formula 1]

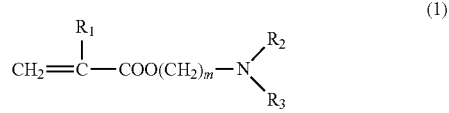

(where $R_1$ is a hydrogen atom or a methyl group, $R_2$ and $R_3$ are independently a monovalent hydrocarbon group, and m is an integer 1 to 6.) In the above General Formula (1), examples of the alkylene group represented by the formula $(CH_2)_m$ include a methylene group, an ethylene group, a trimethylene group, a propylene group, a tetramethylene group, a butylene group, and the like. Examples of the monovalent hydrocarbon group represented by $R_2$ and $R_3$ include an alkyl group including 1 to 4 carbon atoms such as a methyl group, an ethyl group, a propyl group, an isopropyl group, a butyl group, and the like. Specific examples of the amino group-containing ethylenic unsaturated double bond monomer represented by General Formula (1) include dimethylaminoethyl(meth)acrylate, diethylaminoethyl(meth)acrylate, dimethylaminopropyl(meth)acrylate, and diethylaminopropyl(meth)acrylate. The amino group-containing ethylenic unsaturated double bond monomer may be, besides the monomer represented by General Formula (1), dimethylaminopropylacrylamide, dimethylacrylamide, acrylamide, etc.

Another method for producing the amino group-containing vinyl chloride-vinyl acetate-vinyl alcohol copolymer of the present invention includes a method of processing a vinyl chloride-vinyl acetate copolymer by saponification and amine modification in the presence of an amine compound to convert part of the vinyl acetate unit to the vinyl alcohol unit, and additionally reacting some of the chlorine atoms of the vinyl chloride unit with an amine compound, so that an amino group is introduced to a side chain to give an amino group-containing unit. Examples of the amine compound include aliphatic amine, alicyclic amine, aromatic amine, and the like. Specific examples include ethylamine, propylamine, butylamine, cyclohexylamine, ethanolamine, naphthylamine, aniline, O-toluidine, diethylamine, dibutylamine, diisobutylamine, dioctylamine, diethanolamine, N-methylaniline, trimethylamine, triethylamine, tributylamine, triisobutylamine, N-methyldiphenylamine, triethanolamine, and the like.

Further, in terms of discharge stability of the ink and adhesion to the recording medium, the amino group-containing vinyl chloride-vinyl acetate-vinyl alcohol copolymer may be preferably used that contains the vinyl alcohol units at an occupancy ratio of 4 to 7% by mass in the copolymer. If the occupancy ratio of the vinyl alcohol units in the copolymer is less than 4% by mass, adhesion tends to decrease, whereas if it exceeds 7% by mass, discharge stability tends to decrease.

Also, in the amino group-containing vinyl chloride-vinyl acetate-vinyl alcohol copolymer, the amino group-containing vinyl chloride units and the vinyl acetate units are preferably contained in the range of 80/20 to 99/1 (amino group-containing vinyl chloride units/vinyl acetate units) by mass ratio.

Furthermore, the content of the amino group-containing units in the amino group-containing vinyl chloride-vinyl acetate-vinyl alcohol copolymer is preferably 0.1 to 5% by mass in the copolymer. If the ratio of the amino group-containing units is less than 0.1% by mass, discharge stability tends to decrease.

The number-averaged molecular weight of the amino group-containing vinyl chloride-vinyl acetate-vinyl alcohol copolymer is preferably in the range of 10,000 to 50,000. The number-averaged molecular weight exceeding the above range tends to increase the viscosity and hinder discharging of the ink from the nozzle.

Examples of commercially available products of the amino group-containing vinyl chloride-vinyl acetate-vinyl alcohol copolymer include SOLBIN TAO and SOLBIN TAOL (manufactured by Nissin Chemical Industry Co., Ltd.).

The content of the amino group-containing vinyl chloride-vinyl acetate-vinyl alcohol copolymer in the ink composition is preferably 2 to 8% by mass. If the content of the amino group-containing vinyl chloride-vinyl acetate-vinyl alcohol copolymer is less than 2% by mass, discharge stability decreases, and if the content exceeds 8% by mass, viscosity increases, which decreases adhesion to non-absorbable recording media.

It should be noted that, to the extent that it does not reduce performance, an acrylic-based resin, vinyl chloride-based resin, vinyl chloride-vinyl acetate-based resin not containing an amino group, ethylene-vinyl acetate-based resin, styrene-acrylic-based resin, styrene-maleic acid-based resin, rosin-based resin, rosin ester-based resin, petroleum resin, cumarone indene-based resin, terpene phenol-based resin, phenol resin, urethane resin, melamine resin, urea resin, epoxy-based resin, cellulose-based resin, xylene resin, alkyd resin, aliphatic hydrocarbon resin, butyral resin, maleic acid resin, fumaric acid resin, etc., may also be combined.

It should be noted that a butyral resin may, but does not necessarily have to, be used.

(Conductivity-Imparting Agent)

The present invention uses a metal salt of thiocyanic acid as the conductivity-imparting agent. In particular, sodium thiocyanate may be used. Additionally, it includes tetraalkylammonium hexafluorophosphate.

As the tetraalkylammonium hexafluorophosphate, one or more types selected from tetraethylammonium hexafluorophosphate, tetrahexylammonium hexafluorophosphate, and tetrabutylammonium hexafluorophosphate may be used.

Containing such a conductivity-imparting agent in the continuous inkjet ink composition can provide conductivity and demonstrate an effect of charge adjustment.

A metal salt of thiocyanic acid is mixed into the continuous inkjet ink composition in an amount of 0.05 to 1.7% by mass. It is preferably mixed in an amount of 0.08 to 1.4% by mass, and more preferably in an amount of 0.15 to 1.0% by mass. An amount that is less than 0.05% by mass may possibly cause corrosion of a metal member due to a decrease in the anticorrosion effect or, may possibly deteriorate the image quality caused by deterioration of jetting property due to a decrease in the conductivity of the ink composition. An amount exceeding 1.7% by mass may possibly decrease storage stability and degrade image quality.

Tetraalkylammonium hexafluorophosphate is mixed into the continuous inkjet ink composition in an amount of 0.05 to 2.7% by mass. It is preferably mixed in an amount of 0.08 to 2.0% by mass, and more preferably in an amount of 0.5 to 1.5% by mass. An amount that is less than 0.05% by mass fails to impart sufficient conductivity, which may possibly result in deteriorating discharge stability using deflecting electrodes, and degrading image quality. An amount exceeding 2.7% by mass may possibly deteriorate the storage stability, which also degrades the image quality.

(Organic Solvent)

The organic solvent contained in the continuous inkjet ink composition of the present invention is, firstly, preferably ketones such as methyl ethyl ketone, diethyl ketone, and dimethyl ketone.

Examples further include monovalent alcohols such as methanol, ethanol, n-propanol, isopropanol, n-butanol, amyl alcohol, benzyl alcohol, cyclohexanol, and diacetone alcohol, bivalent alcohols such as ethylene glycol, diethylene glycol, trimethylene glycol, triethylene glycol, tetraethylene glycol, polyethylene glycol, and propylene glycol, alkylene glycol monoalkyl ethers such as ethylene glycol monomethyl ether, diethylene glycol monoethyl ether, diethylene glycol monobutyl ether, propylene glycol monomethyl ether, propylene glycol monoethyl ether, and dipropylene glycol monoethyl ether, alkylene glycol monoacetates such as ethylene glycol monoacetate and propylene glycol monoacetate, alkylene glycol monoalkyl ether monoacetates such as ethylene glycol monomethyl ether monoacetate and propylene glycol monomethyl ether monoacetate, alkyl lactate esters such as methyl lactate and butyl lactate, lactones such as γ-butyrolactone, ketones such as dimethyl ketone, methyl ethyl ketone, and methyl isobutyl ketone, amides, and nitrogen-containing compound such as morpholine and pyridine. However, organic solvents that can be used in the present invention are not limited to these solvents. Any of these solvents may be used alone, or two or more types may be combined. In particular, as the organic solvent that improves electrical conductivity of the ink and drying properties of the ink, an organic solvent containing methyl ethyl ketone, methanol, or ethanol is preferable. If the conductivity-imparting agent does not dissolve in the methyl ethyl ketone, methanol, or ethanol, an organic solvent in which the conductivity-imparting agent dissolves is added by an appropriate amount.

It should be noted that propylene glycol methyl ether acetate may, but does not necessarily have to, be contained.

In addition, preferably the total amount of organic solvent accounts for 80.0 to 98.0% by mass in the total ink composition. If the aforementioned total amount exceeds 98.0% by mass, printability of the obtained ink drops; if the total amount is under 80.0% by mass, on the other hand, a rise in ink viscosity is induced and discharge property of the ink from the nozzle tends to drop, which is not desired.

Furthermore, preferably the total amount of organic solvent accounts for 75.0 to 95.0% by mass in the total ink composition particularly in the case in which an inorganic pigment such as titanium oxide is used. If the aforementioned total amount exceeds 95.0% by mass, printability of the obtained ink drops; if the total amount is under 75.0% by mass, on the other hand, a rise in ink viscosity is induced and discharge property of the ink from the nozzle tends to drop, which is not desired.

<Other Components>

Furthermore, the continuous inkjet ink composition of the present invention may include, according to needs, various types of additives such as viscosity-adjusting agent, anticorrosion agent, defoaming agent, plasticizer, surface conditioner, ultraviolet protective agent, photostabilizer, antioxidant, etc. and additives such as silicone-based surfactants and a fluorine-containing surfactant to prevent spreading of the dot of the landing ink and to improve film property such as rub resistance of the printed film.

[Production of Continuous Inkjet Ink Composition]

Next, a method for producing the continuous inkjet ink composition of the present invention is described.

The continuous inkjet ink composition of the present invention can be obtained by, for example, dispersing and mixing the materials using a wet circulation mill, bead mill, ball mill, sand mill, attritor, roll mill, DCP mill, agitator, Henschel mixer, colloid mill, ultrasonic homogenizer, high-pressure homogenizer (Microfluidizer, Nanomizer, Ultimizer, Genus PY, DeBEE 2000, etc.), pearl mill, or other dispersers, and adjusting the viscosity of the continuous inkjet ink composition to 2 to 10 mPa·s.

Preferably the content of all organic solvents in the continuous inkjet ink composition of the present invention, which is the total amount of ink composition less the total sum of the amounts of binder resin, pigment, dispersant, and other additives that may be used as necessary, is changed as deemed appropriate so as to bring the ink viscosity into the aforementioned range.

The thus obtained continuous inkjet ink composition of the present invention can be used with inkjet printers on base materials whose top face layer at least is constituted by a vinyl chloride-based polymer or ethylene-vinyl acetate-based copolymer.

EXAMPLES

The present invention is explained in greater detail below using examples; however, the present invention is not limited to these examples. It should be noted that, unless otherwise specified, "%" means "% by mass," while "part" means "part by mass."

The materials used in the Examples and Comparative Examples below are listed below. All components other than solvents are expressed in solids content.

In the table, the unit of values in the rows of Pigments, Dispersants, Resins, Solvents, and Total is "% by mass."

<Titanium Oxide-Containing Base Ink>

8 parts by mass of SOLSPERSE 39000 (manufactured by Lubrizol Corporation), which is a polymeric dispersant, were dissolved in 52 parts by mass of methyl ethyl ketone. To the solution was added titanium oxide by 40 parts by mass as the pigment, which was then agitated to be mixed, followed by kneading using a bead mill to give a white base ink.

<PY155-Containing Base Ink>

8 parts by mass of SOLSPERSE 39000 (manufactured by Lubrizol Corporation), which is a polymeric dispersant, were dissolved in 72 parts by mass of methyl ethyl ketone. To the solution was added PY155 (pigment yellow) by 20 parts by mass as the pigment, which was then agitated to be mixed, followed by kneading using a bead mill to give a yellow base ink.

<Resins>

Amino group-containing vinyl chloride-vinyl acetate-vinyl alcohol copolymer (mass ratio of vinyl chloride units/vinyl acetate units/vinyl alcohol units/amino group-containing units=89/2/6/3, number-averaged molecular weight: 14,000)

<Conductivity-Imparting Agent>

Sodium thiocyanate

Tetraethylammonium hexafluorophosphate (TEAHFP)

Tetrabutylammonium hexafluorophosphate (TBAHFP)

Tetrahexylammonium hexafluorophosphate (THAHFP)

<Additives>

Polyether-modified polydimethylsiloxane

<Solvent>

Methyl ethyl ketone (Evaluation)

Storage Stability: Viscosity was measured after storage for two weeks at 60° C., and the increase rate of the viscosity relative to the viscosity before storage was calculated.

Increase rate of viscosity less than 10%: ○

Increase rate of viscosity 10% or more and less than 20%: Δ

Increase rate of viscosity 20% or more: ×

Corrosion of Metal Member: A SUS member was immersed in the 60° C. ink composition for two weeks, and the appearance was visually observed.

No change: ○

Corrosion was partially observed: Δ

Corrosion on the entire surface: ×

Evaluation of Image Quality: Letters were printed on a PET film surface using a continuous inkjet printer.

Printing was completed without cockle: ○

Printing was completed but cockle occurred: Δ

Printing could not be completed, or printed letters were indecipherable: ×

TABLE 1

| | | Examples | | | | | | | | | | Comparative Examples | | | |
|---|---|---|---|---|---|---|---|---|---|---|---|---|---|---|---|
| | | 1 | 2 | 3 | 4 | 5 | 6 | 7 | 8 | 9 | 10 | 1 | 2 | 3 | 4 |
| Base inks | Titanium oxide | 25.0 | 25.0 | 25.0 | 25.0 | 25.0 | 25.0 | 25.0 | 25.0 | 25.0 | | 25.0 | 25.0 | 25.0 | 25.0 |
| | PY155 | | | | | | | | | | 20.0 | | | | |
| Resin | Amino group-containing vinyl chloride-vinyl acetate-vinyl alcohol copolymer | 4.0 | 2.0 | 6.0 | 4.0 | 4.0 | 4.0 | 4.0 | 4.0 | 4.0 | 4.0 | 4.0 | 4.0 | 4.0 | 4.0 |
| Conductivity-imparting agents | Sodium thiocyanate | 0.2 | 0.2 | 0.2 | 0.2 | 0.2 | 0.1 | 1.5 | 0.1 | 1.5 | 0.2 | 1.2 | | 1.8 | 0.1 |
| | Tetraethylammonium hexafluorophosphate | 1.0 | 1.0 | 1.0 | | | 2.5 | 0.1 | 0.1 | 2.5 | 1.0 | | 1.2 | 0.1 | 2.8 |
| | Tetrabutylammonium hexafluorophosphate | | | | 1.0 | | | | | | | | | | |
| | Tetrahexylammonium hexafluorophosphate | | | | | 1.0 | | | | | | | | | |
| Additives | Polyether-modified poly dimethylsiloxane | 0.1 | 0.1 | 0.1 | 0.1 | 0.1 | 0.1 | 0.1 | 0.1 | 0.1 | 0.1 | 0.1 | 0.1 | 0.1 | 0.1 |
| Solvent | Methyl ethyl ketone | 69.7 | 71.7 | 67.7 | 69.7 | 69.7 | 68.3 | 69.3 | 70.7 | 66.9 | 74.7 | 69.7 | 69.7 | 69.0 | 68.0 |
| | Total | | | | | | | | | 100.0 | | | | | |
| Evaluation items | Storage stability | ○ | ○ | ○ | ○ | ○ | Δ | ○ | ○ | Δ | ○ | Δ | Δ | X | X |
| | Corrosion of metal member | ○ | ○ | ○ | ○ | ○ | ○ | ○ | Δ | ○ | ○ | ○ | X | ○ | Δ |
| | Evaluation of image quality | ○ | ○ | Δ | ○ | ○ | ○ | ○ | Δ | ○ | ○ | X | X | X | X |

The example conforming to the present invention demonstrated excellent storage stability, anticorrosion effect on a metal member, and good image quality.

In contrast, Comparative Example 1, which did not contain tetraalkylammonium hexafluorophosphate, had poor image quality. Comparative Example 2, which did not contain sodium thiocyanate, caused corrosion of a metal member, and additionally had poor image quality. Comparative Example 3, which contained excessive sodium thiocyanate, had poor storage stability and image quality. Also, Comparative Example 4, which contains excessive tetraalkylammonium hexafluorophosphate, had poor storage stability and image quality. Furthermore, since the amount of sodium thiocyanate was small, anticorrosion effect was insufficient, and corrosion of the metal member occurred.

What is claimed:

1. A continuous inkjet ink composition containing a pigment, a resin, a metal salt of thiocyanic acid at 0.05 to 1.7% by mass in the composition, and tetraalkylammonium hexafluorophosphate at 0.05 to 2.7% by mass in the composition.

2. The continuous inkjet ink composition according to claim 1, which contains one or more types selected from tetraethylammonium hexafluorophosphate, tetrabutylammonium hexafluorophosphate, and tetrahexylammonium hexafluorophosphate as the tetraalkylammonium hexafluorophosphate.

3. The continuous inkjet ink composition according to claim 1, wherein the metal salt of thiocyanic acid is sodium thiocyanate.

4. The continuous inkjet ink composition according to claim 1, which contains a polydimethylsiloxane compound.

5. The continuous inkjet ink composition according to claim 2, wherein the metal salt of thiocyanic acid is sodium thiocyanate.

6. The continuous inkjet ink composition according to claim 2, which contains a polydimethylsiloxane compound.

7. The continuous inkjet ink composition according to claim 3, which contains a polydimethylsiloxane compound.

8. The continuous inkjet ink composition according to claim 5, which contains a polydimethylsiloxane compound.

9. The continuous ink jet composition according to claim 1, wherein the resin contains an amino group-containing vinyl chloride-vinyl acetate-vinyl alcohol copolymer.

10. The continuous inkjet ink composition according to claim 1, which contains no epoxy-based resin.

* * * * *